United States Patent
Akens et al.

(10) Patent No.: US 10,284,444 B2
(45) Date of Patent: May 7, 2019

(54) VISUAL REPRESENTATION OF END USER RESPONSE TIME IN A MULTI-TIERED NETWORK APPLICATION

(71) Applicant: AirMagnet, Inc., Santa Clara, CA (US)

(72) Inventors: Geoff Akens, Colorado Springs, CO (US); Bryan K. Laver, Colorado Springs, CO (US); Robert Vogt, Colorado Springs, CO (US)

(73) Assignee: AirMagnet, Inc., Santa Clara, CA (US)

( * ) Notice: Subject to any disclaimer, the term of this patent is extended or adjusted under 35 U.S.C. 154(b) by 311 days.

(21) Appl. No.: 15/056,596

(22) Filed: Feb. 29, 2016

(65) Prior Publication Data
US 2017/0250880 A1 Aug. 31, 2017

(51) Int. Cl.
*G06F 15/173* (2006.01)
*H04L 12/26* (2006.01)
*H04L 12/24* (2006.01)

(52) U.S. Cl.
CPC ........ *H04L 43/045* (2013.01); *H04L 41/0631* (2013.01); *H04L 41/142* (2013.01); *H04L 41/5067* (2013.01); *H04L 43/0852* (2013.01); *H04L 41/22* (2013.01)

(58) Field of Classification Search
CPC . H04L 43/045; H04L 41/0631; H04L 41/142; H04L 41/22; H04L 41/5067
See application file for complete search history.

(56) References Cited

U.S. PATENT DOCUMENTS

| 5,845,277 | A  | * | 12/1998 | Pfeil | H04L 41/22 |
| 8,874,719 | B1 | * | 10/2014 | Burnett | H04L 41/28 709/223 |
| 9,537,720 | B1 | * | 1/2017 | Baggott | H04L 41/12 |
| 2005/0060048 | A1 | * | 3/2005 | Pierre | G06Q 10/06 700/28 |
| 2006/0050634 | A1 | * | 3/2006 | Gous | H04L 41/0896 370/229 |
| 2007/0280113 | A1 | * | 12/2007 | Ninan | H04L 41/22 370/235 |

(Continued)

*Primary Examiner* — Mohamed A Wasel
(74) *Attorney, Agent, or Firm* — Locke Lord LLP; Scott D. Wofsy; Christopher J. Capelli

(57) ABSTRACT

A method for visual representation of end user response time (EURT) in a multi-tiered network application is provided. Search criteria for searching a repository of client statistics records is received. The search criteria specifies identification information pertaining to a user of a multi-tiered network application experiencing application performance problems and a time period associated with the application performance problems. The identification information identifies an IP address of user's computing device. A plurality of client statistics records matching the search criteria is retrieved from the repository. The retrieved plurality of client statistics records is sorted based on measurements of performance parameters. A graph representing relevant topology hierarchy of the multi-tiered network application is presented to a user based on the sorted client statistics records. The graph visually identifies connections between nodes of the multi-tiered application. The identified connections include potential root-causes of the specified application performance problems.

12 Claims, 5 Drawing Sheets

(56) References Cited

U.S. PATENT DOCUMENTS

| | | | |
|---|---|---|---|
| 2013/0246130 A1* | 9/2013 | Michel | G06Q 10/067 |
| | | | 705/7.36 |
| 2015/0052441 A1* | 2/2015 | Degioanni | G06F 11/3495 |
| | | | 715/734 |
| 2016/0378389 A1* | 12/2016 | Hrischuk | G06F 3/0631 |
| | | | 711/154 |

* cited by examiner

VISUAL REPRESENTATION OF END USER RESPONSE TIME IN A MULTI-TIERED NETWORK APPLICATION

FIELD OF THE INVENTION

This specification is in general, to data visualization of network monitoring data, and, more particularly, to a method for rendering a N-Tiered EURT (End User Response Time) breakdown graph for problem domain isolation.

BACKGROUND OF THE INVENTION

Modern applications are characterized by multiple components deployed across multiple network tiers accessed by users across a network. Examples of applications include enterprise applications, such as Enterprise Resource Planning (ERP), Customer Relationship Management (CRM), Supply Chain Management (SCM), and Online Banking, Brokerage, Insurance and Retailing applications. An application typically provides a variety of business functions that users may execute. For example, an online stock trading application may provide some of the following business functions: log in, display account status, retrieve stock prospectus, sell stock, buy stock and log out.

When a user executes such a business function, a sequence of transactions is performed by the application, with each transaction consisting of a source node transmitting a request (via network message) to a destination node often on another tier, and perhaps waiting for a reply message. The destination node processes the request and in the processing consumes local (server) resources such as CPU, disk input/output, and memory and may generate subsequent requests (subtransactions) to other nodes.

The time that elapses between the user executing the business function (submitting his or her request) and the display of the results on the user's workstation is called the end user response time. The end user response time is typically the most critical measure of end user satisfaction with application performance. If the response times are too long, end users will be unsatisfied and many will take their business elsewhere.

In order to maintain and improve good end user performance, application and system managers must understand the current performance of their applications, be able to identify and predict current and future performance problems, and evaluate potential solutions to those problems. Any given application performance problem is a reflection of application performance, data size, network performance and network congestion. Determining which domain of responsibility a particular application performance problem falls into is a complex evaluation of the constituent parts of the end user response time measure, since modern N-tiered applications typically run across multiple interdependent servers. Problems can be located on any of those servers and can originate from multiple sources, such as, but not limited to, the client or server environment, the network or the application software.

Currently, there are performance monitoring tools which monitor a wide range of performance data. While such tools are useful in identifying certain performance issues, in an N-tiered application, at any given moment, there may be hundreds or thousands of concurrent transactions within a single tier that need to be analyzed over a short period of time. Next, the results of such analysis can be used to navigate through each of the individual tiers of the network to determine a source of the problem. Thus, existing monitoring tools are limited in their diagnostic capabilities with respect to N-tiered applications, since in order to identify a root cause of any failure it is necessary to manually analyze potentially hundreds of concurrent transactions at each network tier. This is a very complex, error-prone and time consuming task. In addition, such tasks can be performed only by the most experienced IT professionals.

Accordingly, it would be advantageous to provide visual representations of the constituent parts of end user response time measurements that enable a wider range of users to identify the cause or causes of various performance issues.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a method for visual representation of end user response time in a multi-tiered network application is described in which an illustrated embodiment includes receiving, search criteria for searching a repository of client statistics records. The search criteria specifies identification information pertaining to a user of a multi-tiered network application experiencing one or more performance problems and a time period associated with the one or more performance problems. The identification information identifies an IP address of user's computing device. A plurality of client statistics records matching the search criteria is retrieved from the repository. The retrieved plurality of client statistics records is sorted based on measurements of performance parameters. A graph representing relevant topology hierarchy of the multi-tiered network application, with respect to the performance problems, is presented to a user based on the sorted client statistics records. The graph visually identifies one or more connections between nodes of the multi-tiered application. The identified connections include potential root-causes of the specified application performance problems.

In another aspect, a computer program product for visual representation of end user response time in a multi-tiered network application is provided. The computer program product includes one or more computer-readable storage devices and a plurality of program instructions stored on at least one of the one or more computer-readable storage devices. The plurality of program instructions includes program instructions to receive search criteria for searching a repository of client statistics records. The search criteria specifies identification information pertaining to a user of a multi-tiered network application experiencing one or more application performance problems and a time period associated with the one or more application performance problems. The identification information identifies an IP address of user's computing device. The plurality of program instructions further includes program instructions to retrieve from the repository a plurality of client statistics records matching the search criteria. The plurality of program instructions further includes program instructions to sort the retrieved plurality of client statistics records based on measurements of performance parameters. The plurality of program instructions further includes program instructions to present a graph representing relevant topology hierarchy of the multi-tiered network application based on the sorted client statistics records. The graph visually identifies one or more connections between nodes of the multi-tiered network application. The identified connections include potential root-causes of the application performance problems.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
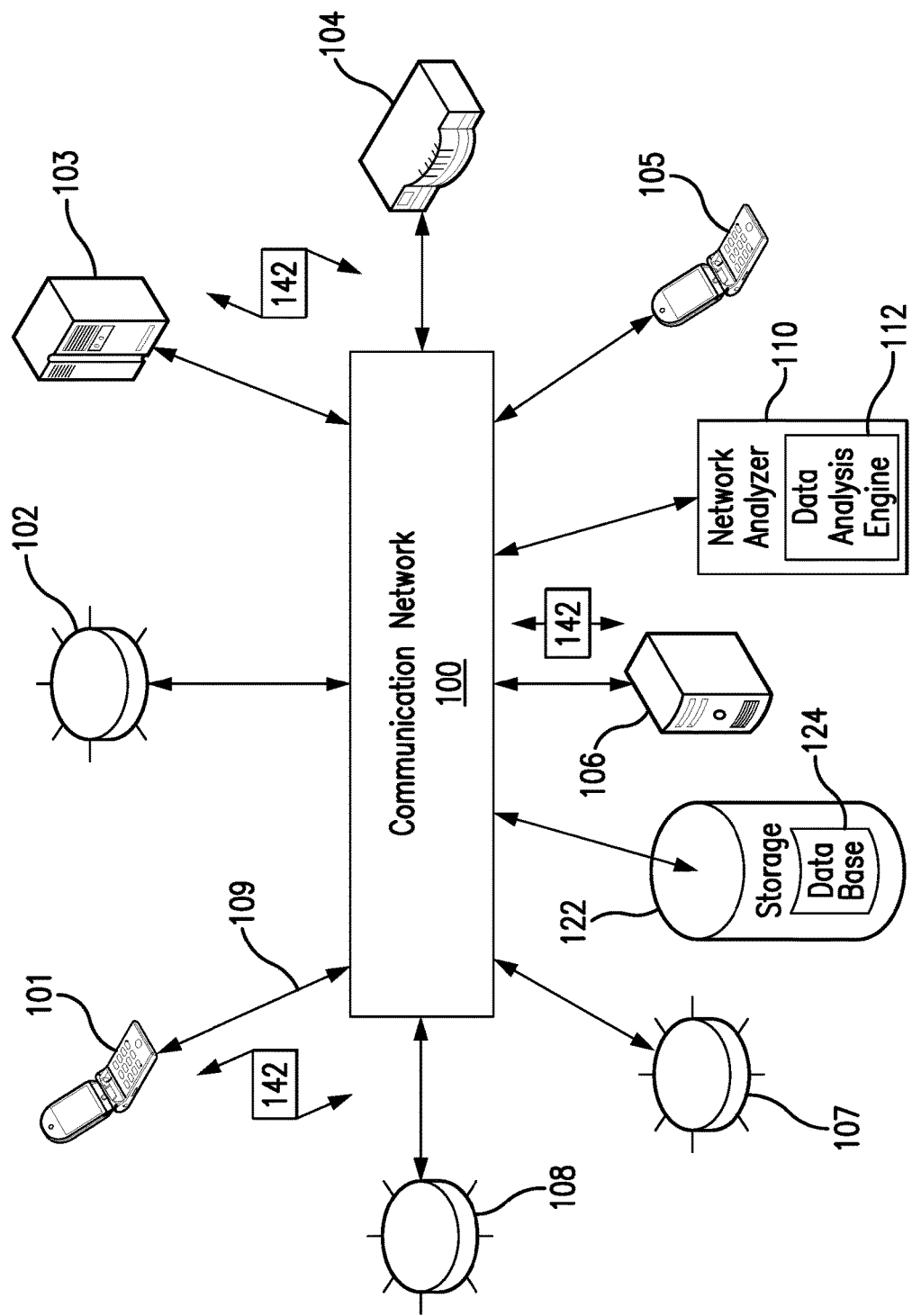
FIG. 1 illustrates an example communication network in accordance with an illustrated embodiment.

The present invention is now described more fully with reference to the accompanying drawings, in which illustrated embodiments of the present invention is shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein. One skilled in the art will appreciate further features and advantages of the invention based on the below-described embodiments. Accordingly, the invention is not to be limited by what has been particularly shown and described, except as indicated by the appended claims.

Turning now descriptively to the drawings, in which similar reference characters denote similar elements throughout the several views, FIG. 1 depicts an exemplary communication network 100 in which bellow illustrated embodiments may be implemented.

It is to be understood a communication network 100 is a geographically distributed collection of nodes interconnected by communication links and segments for transporting data between end nodes, such as smart phones, tablets, personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

The exemplary communication network 100 of FIG. 1 illustratively comprises nodes/devices 101-108 (e.g., sensors 102, client computing devices 103, smart phone devices 101, 105, servers 106, routers 107, switches 108 and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

Network monitoring is an important operational scheme for network operators. According to an embodiment of the present invention, a network analyzer device 110 is also communicatively connected to the network 100. The network analyzer device 110 may include a user interface (not shown in FIG. 1) that enables a user to interact with the network analyzer device 110, to operate the network analyzer device 110, and to obtain data therefrom, whether at the location of installation or remotely. Alternatively, the client computing device 103 may include the user interface communicatively coupled to the network analyzer device 110.

According to an embodiment of the present invention, network analyzer device 110 may comprise, or otherwise may cooperate with a data analysis engine 112. Data analysis engine 112 may comprise program instructions stored on one or more computer-readable storage devices, which may include internal storage on the network analyzer device 110. Data analysis engine 112 may be configured to monitor traffic on the communication network 100, as well as to perform various testing and measurement operations, to conduct analysis of collected data, to present data to a user, and the like. In an embodiment of the present invention, data analysis engine 112 may be, for example, a computer program or program component capable of providing certain information about end user's response time with respect to one or more multi-tiered applications, as described in more detail below. The multi-tiered applications may include multiple individual applications. A multi-tiered application may be deployed and configured to multiple nodes/devices 101-108. Data gathered, generated, and maintained for use by the data analysis engine 112, such as client statistics records described below, may be kept in the internal storage of the network analyzer device 110 or in one or more databases 124 of a storage unit 122.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
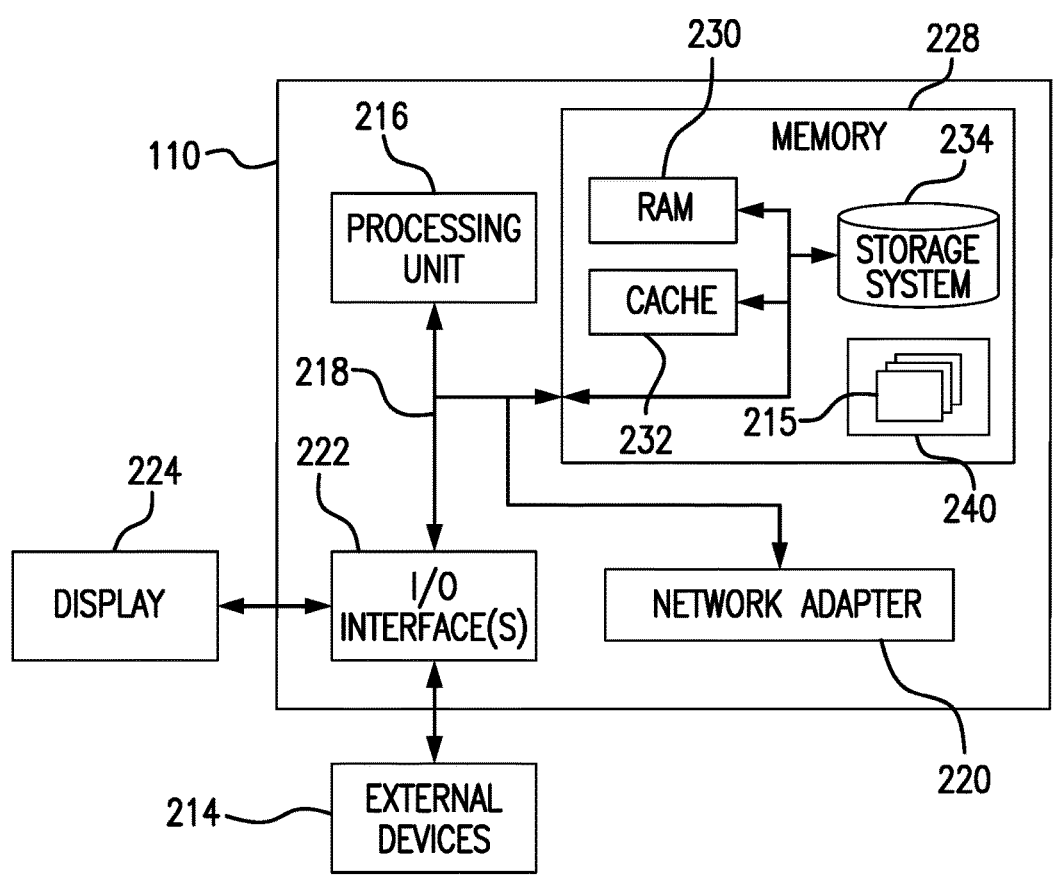
FIG. 2 illustrates internal and external components of a network analyzer device/node in accordance with an illustrative embodiment of the present invention.

FIG. 2 is a schematic block diagram of an example network analyzer device 110 that may be used (or components thereof) with one or more embodiments described herein. Network analyzer device 110 is only one example of a suitable system and is not intended to suggest any limitation as to the scope of use or functionality of embodiments of the invention described herein. Regardless, network analyzer device 110 is capable of being implemented and/or performing any of the functionality set forth herein.

Network analyzer device 110 is operational with numerous other general purpose or special purpose computing system environments or configurations. Examples of well-known computing systems, environments, and/or configurations that may be suitable for use with network analyzer device 110 include, but are not limited to, personal computer systems, server computer systems, thin clients, thick clients, hand-held or laptop devices (including mobile devices such as smart phones and tablets), multiprocessor systems, microprocessor-based systems, set top boxes, programmable consumer electronics, network PCs, minicomputer systems, mainframe computer systems, and distributed data processing environments that include any of the above systems or devices, and the like.

Network analyzer device 110 may be described in the general context of computer system-executable instructions, such as program modules, being executed by a computer system. Generally, program modules may include routines, programs, objects, components, logic, data structures, and so on that perform particular tasks or implement particular abstract data types. Network analyzer device 110 may be practiced in distributed data processing environments where tasks are performed by remote processing devices that are linked through the communication network 100. In a distributed data processing environment, program modules may be located in both local and remote computer system storage media including memory storage devices.

Network analyzer device 110 is shown in FIG. 2 in the form of a general-purpose computing device. The components of device 110 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Network analyzer device 110 typically includes a variety of computer system readable media. Such media may be any available media that is accessible by device 110, and it includes both volatile and non-volatile media, removable and non-removable media.

System memory 228 can include computer system readable media in the form of volatile memory, such as random access memory (RAM) 230 and/or cache memory 232. Network analyzer device 110 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as data analysis engine module 112 described below, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Network analyzer device 110 may also communicate with one or more external devices 214 such as a keyboard, a pointing device, a display 224, etc.; one or more devices that enable a user to interact with network analyzer device 110; and/or any devices (e.g., network card, modem, etc.) that enable network analyzer device 110 to communicate with one or more other computing devices. Such communication can occur via Input/Output (I/O) interfaces 222. Still yet, device 110 can communicate with one or more networks such as a LAN, a general WAN, and/or a public network (e.g., the Internet) via network adapter 220. As depicted, network adapter 220 communicates with the other components of network analyzer device 110 via bus 218. It should be understood that although not shown, other hardware and/or software components could be used in conjunction with device 110. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

The application of visualization techniques to data-intensive tasks and analysis is generally useful for the purpose of facilitating data understanding and the completion of data-dependent tasks (such as troubleshooting enterprise application problems and optimizing computer network performance). The term "visualization" here refers to the transformation of numerical data into graphical objects generated by computer software and viewed by the software user. Advantageously, various embodiments of the present invention utilize visualization techniques to present complex data in a concise and comprehensible way.

In many enterprises different groups of people support different parts of enterprise applications. Typically, people are divided into groups based on domains of responsibility. For example, network engineering experts may not be best to diagnose and resolve enterprise application problems. On the other hand, the application support team may be ill suited to diagnose and resolve network issues. Moreover, often an issue experienced by a user of an enterprise application is merely a symptom of a different problem. Any given enterprise application performance criteria, including but not limited to, the amount of time it takes a network application to respond to a user request, also referred to herein as EURT, can be influenced by a variety of different factors. For instance, such factors may include application performance, server response time, the size of data being transferred between the server and a client device, client device's response time, network performance, the speed of all network devices contributing to the overall response time, the level of loading or congestion within the network, and network routing protocol optimization, among many other factors. Accordingly, determination whether a problem falls within a particular domain of responsibility may involve a complicated evaluation of the components of EURT. As used herein, the term "EURT" refers to a performance measurement indicative of the quality of user's experience with a multi-tiered enterprise application.

For the purpose of illustration of various embodiments of the present invention, EURT comprises four components, more specifically, application delay, network delay, server delay and client delay. In the following discussion, "application latency" or "application delay" is one of the key aspects of multi-tiered application performance monitoring and is defined as the time it takes a multi-tiered application to respond to user requests. "Network delay" addresses the time it takes for a data element (a packet or set of packets) to traverse the network from the end user to the network location of the multi-tiered application processing hardware node (virtual or otherwise) and back. A number of elements factor into this, including the payload size, overall network bandwidth available to the user/application, the maximum transmission unit (MTU) along the data path, and the round trip response time (RTT)—the time it takes data packets to simply traverse the network including any switching or routing latencies. "Server delay" and "client delay" refer to delays attributed to a server and a client, respectively. While a large application delay value is typically indicative of an application problem and a large network delay value typically indicates a network issue, identification of potential locations and sources of problems (i.e., applications issue and network issue) in multi-tiered applications presents a significant challenge, however, due to a variety of factors discussed above. Advantageously, various embodiments of the present invention present visualization of the relevant constituent components of EURT in a manner enabling a wide range of users to identify the cause or causes of poor EURT measurements.

In one embodiment, the data analysis engine 112 may monitor, track and/or log user login sessions. For each login session the data analysis engine 112 records an incoming client IP address (i.e., IP addresses of client computing devices 103 and/or smart phone devices 101, 105), user identification information (such as account number) and time of each session occurring with the monitored target server (i.e., server 106). In some embodiments, the data analysis engine 112 will monitor a plurality of sites. Each of the sites defines a collection of devices having mutually exclusive IP addresses. Further, at each site there may be a plurality of particular servers available to a particular user or to a particular computer/device. In other words, the data analysis engine 112 maintains a list of IP addresses, where each IP address (i.e., IP addresses of client computing devices 103 and/or smart phone devices 101, 105) corresponds to a single site.

In addition, the data analysis engine 112 may be configured and operable to generate and maintain baseline performance statistics on monitored IP addresses based on sites and applications. Further, the data analysis engine 112 may generate values defining degradation and excessive thresholds. Each degradation threshold can represent the total response time under which the performance of a monitored system should be considered normal. Each excessive threshold can represent the total response time under which the performance of the monitored system should be considered either degraded or normal. According to embodiments of the present invention, the data analysis engine 112 marks as excessive any observed response time values greater than the excessive threshold value. For purposes of illustration, the degraded threshold may correspond to approximately 50 ms and the excessive threshold may correspond to approximately 85 ms. In one embodiment, both the performance statistic values and threshold values may be stored in one or more databases 124.

According to an embodiment of the present invention, the data analysis engine 112 may be further configured and operable to monitor network traffic and generate client statistic records associated with each user. Such client statistic records may include, but are not limited to, IP addresses of client computing devices 103 and/or smart phone devices 101 and corresponding IP addresses of destination (target) servers 106, application(s) being accessed by user(s) and a plurality of performance metrics values, which include, among others, EURT values.

Figure 3A:
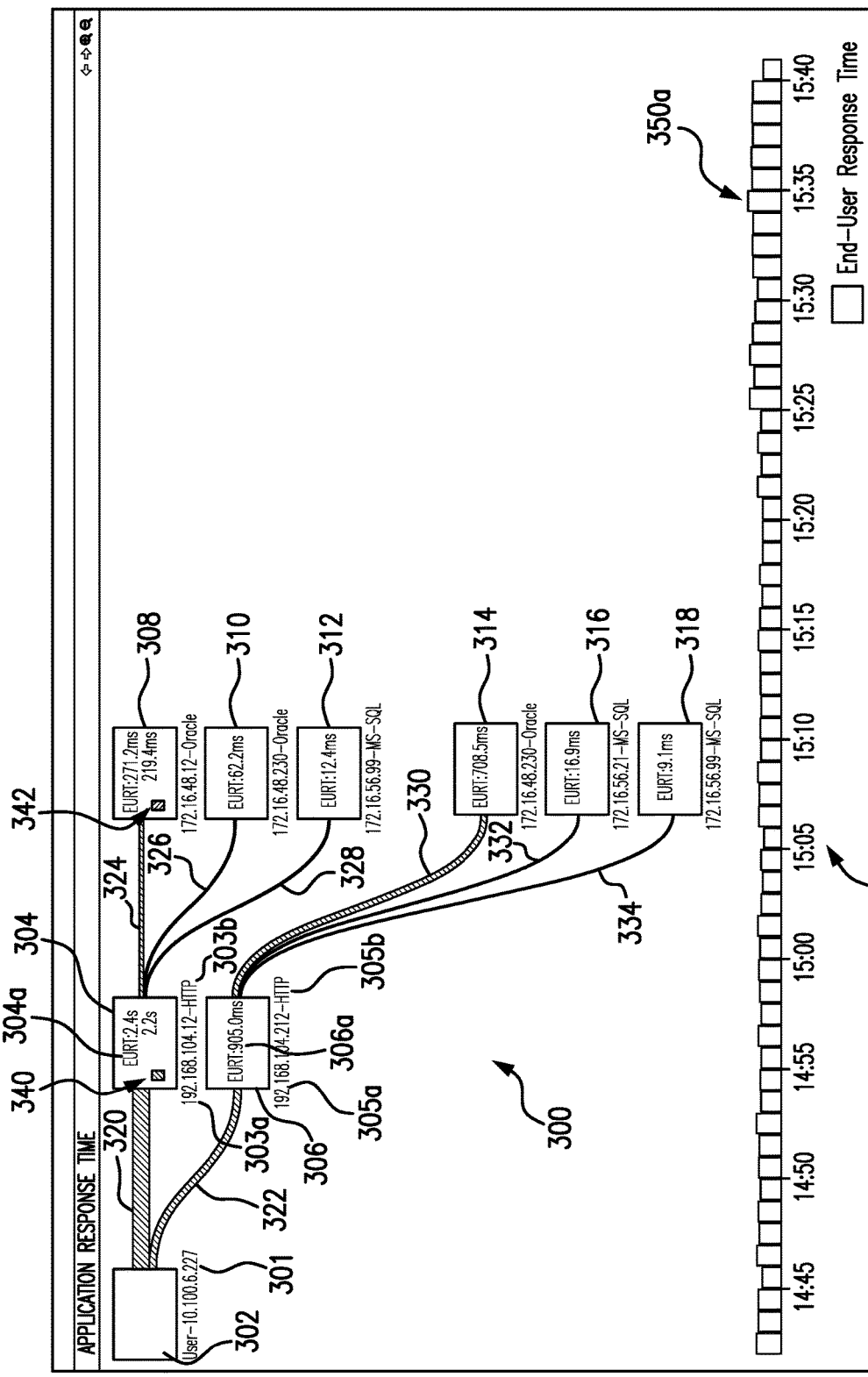
FIGS. 3A and 3B are exemplary visualization components illustrating N-Tiered EURT breakdown graph for problem domain isolation in accordance with illustrative embodiments of the present invention.
Figure 3B:
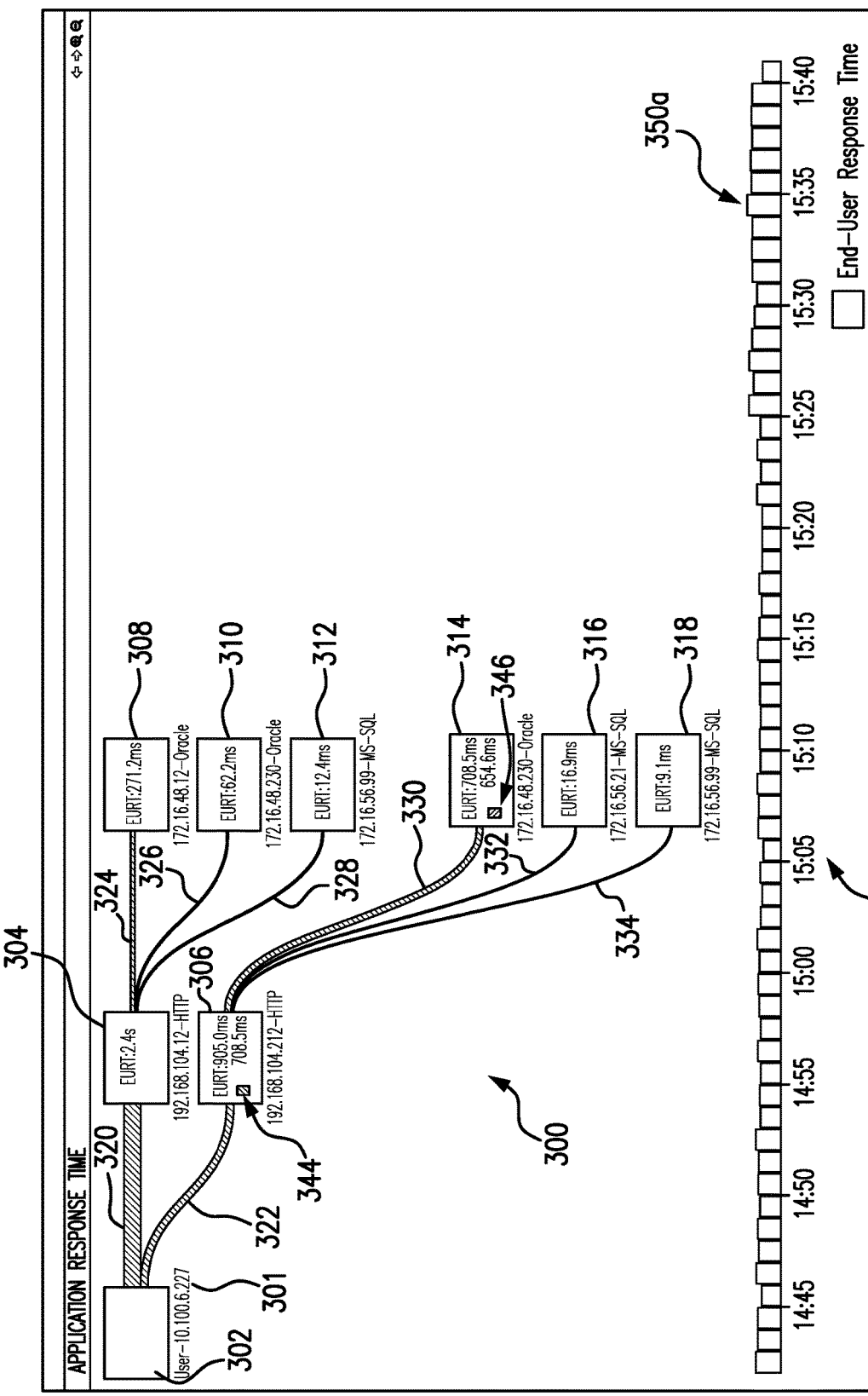

For illustrative purposes only, various embodiments of the present invention separate application issues, network issues, server issues and client issues into different problem domains. Referring now to FIG. 3A, there is shown an exemplary visualization component 300 illustrating N-Tiered EURT breakdown graph for problem domain isolation in accordance with illustrative embodiment of the present invention. The graph 300 is generated by the data analysis engine 112 based on the measurements and statistical data corresponding to a particular user, particular application and a particular time period. The graph 300 represents topology hierarchy of the multi-tiered network application with respect to a specified application performance problem. Each node 302, 304, 306, 308-318 in the graph 300 represents a network device having a unique IP address, such as IP addresses 303a and 305a, and edges 320-334 represent links (network connections) between the devices. As described in greater detail below, the visual component may also present performance metric values, such as EURT values 304a and 306a, corresponding to particular edges between particular nodes. As illustrated in FIGS. 3A and 3B, the graph 300 is generated by the data analysis engine 112, so that it visually identifies (e.g., by color coding schemes and/or edge thickness in visual association with the EURT values) one or more performance problems domains associated with one or more potential root-causes of the specified application performance problems.

Further, according to an embodiment of the present invention, the data analysis engine 112 assigns each node a unique combination of depth and breadth values. In the illustrated embodiments, the graph 300 is generated by the data analysis engine 112 so that depth increases in dimension from left to right and breadth increases in dimension from top to bottom. In other words, the node 302 having both depth and breadth values equal to 1 (one) is displayed in the top left corner, as shown in FIGS. 3A and 3B. FIGS. 3A and 3B will be described in greater detail below in conjunction with FIG. 4.

Figure 4:
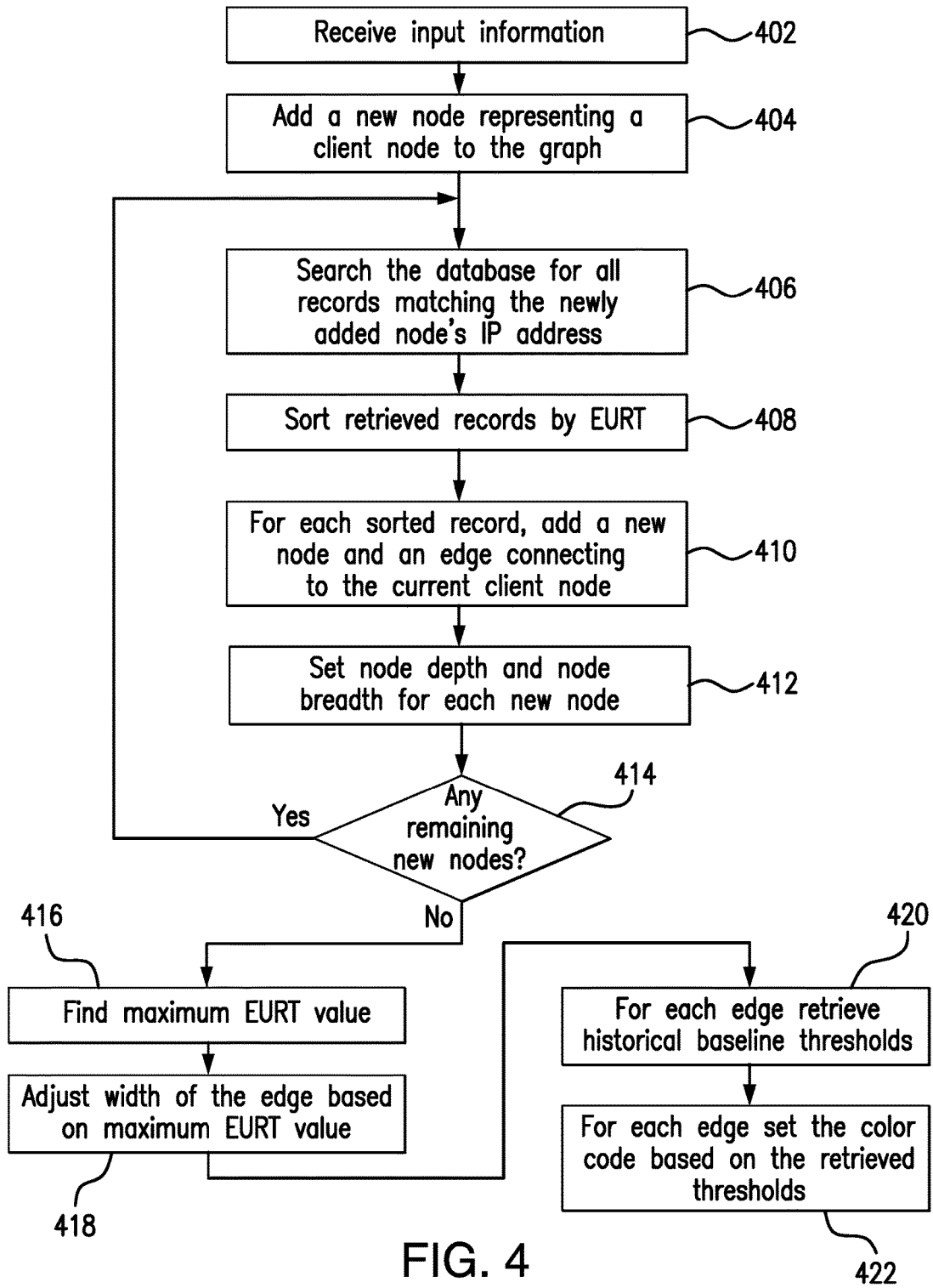
FIG. 4 is a flow diagram of operational steps of the data analysis engine of FIG. 1 in accordance with an illustrative embodiment of the present invention.

FIG. 4 is a flow diagram of operational steps of the data analysis engine 112 of FIG. 1 in accordance with an illustrative embodiment of the present invention. Before turning to description of FIG. 4, it is noted that the flow diagram in FIG. 4 shows examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more steps may be omitted. In some embodiments, one or more additional steps may be performed. As will be appreciated by one skilled in the art, aspects of the present invention may be embodied as a method or computer program product.

At 402, data analysis engine 112 obtains user provided input information (search criteria) which will be used during a subsequent performance (i.e., EURT) investigation. In one embodiment, such information may include identification information pertaining to a user of a multi-tiered network application experiencing one or more application performance problems, identification information pertaining to the multi-tiered application being accessed by the user, and a corresponding time interval to be analyzed (i.e., time period over which the application performance problems have been observed). The user identification information may include any unique identifier (e.g., a username, email address, account number, etc.). For example, data analysis engine 112, prior to generating graph 300 may display prompts (not shown) for the user to submit a username (i.e., john.doe/ABC) and/or IP address (i.e., 10.20.30.40) of user's computing devices 103 and/or smart phone devices 101, 105) to be investigated. In one embodiment, if only user login information is provided, data analysis engine 112 translates this information to an IP address assigned to user's computing device 103. The application identification information specifiable by users may include a name of the application or a name of a component of a multi-tiered application (i.e., HTTP) being accessed by the user of interest. The time interval information specifiable by users may include a user selected time period to be investigated.

At 404, data analysis engine 112 preferably adds a new node representing user's computing device to the graph. Referring back to FIG. 3A, at step 404, data analysis engine 112 generates a first node 302 representing user's computing device. In one embodiment, data analysis engine 112 also associates the generated node 302 with the IP address 301 of user's computing device 103. Further, data analysis engine 112 assigns a combination of depth and breadth values equal to 1 (one) to first node 302. As noted above, since both the depth and breadth values of node 302 are equal to one, data analysis engine 112 places the generated node 302 into the top-left corner of the graph 300.

At 406, in response to a user request to present information of interest with respect to detected application performance problem(s) (i.e., end user response time) for a selected user and, optionally, selected application and/or time interval, data analysis engine 112 retrieves information matching the specified search criteria. In an embodiment of the present invention, data analysis engine 112 searches and retrieves the information of interest from the one or more databases 124 storing collected client statistics records. Further, in various embodiments, data analysis engine 112 supports multi-homing and IP forwarding capabilities of network devices. A multi-homed device behaves as multiple devices (servers) in one, responding to requests to multiple addresses, e.g. ISP.com, XYZCorp.com, johnsmith.com, etc. Furthermore, at least some nodes/devices 101-108 connected to network 100 may comprise multi-homed devices where a device 101-108 uses one IP address for incoming requests and uses a different IP addresses for outbound requests. Thus, at 406, in addition to searching incoming requests for a particular IP address associated with the computing device, data analysis engine 112 may search the one or more databases 124 for other IP addresses (i.e., IP addresses used for outbound requests) associated with the computing device. Data analysis engine 112 may abort the graph generation process and present a corresponding error message to a user if no matching client statistics records exist in the database 124. At 408, the plurality of retrieved client statistics records is merged so as to generate one sorted list. In this list, data analysis engine 112 sorts the records in descending order according to the values of EURT.

Next, data analysis engine 112 iterates through the sorted list of client statistics records in descending order. During such iteration at 410, for each traversed record containing an IP address, data analysis engine 112 adds a corresponding new node to the graph 300. Further, data analysis engine 112 generates a plurality of edges connecting the newly generated nodes to the current client node. As shown, in FIG. 3A, at step 410, data analysis engine 112 adds to the graph 300 a second node 304 and a third node 306 representing one tier of network devices accessed by user's computing device 103 (represented by the first node 302) based on the retrieved relevant client statistics records. According to an embodiment of the present invention, data analysis engine 112 associates each of the newly added nodes 304 and 306 with the sorted retrieved client statistics records which may include information, such as, but not limited to, EURT values 304a and 306a, IP addresses 303a and 305a and applications 303b and 305b, respectively. Further, data analysis engine 112 generates edges 320 and 322 connecting second node 304 and third node 306, respectively, to the first node 302. Edges 320 and 322 represent network connections (links) between the corresponding devices.

At 412, data analysis engine 112 sets depth and breadth values for each newly added nodes, according to the following formulas (1) and (2):

$$\text{Node depth}=1+\text{depth of client Node} \quad (1),$$

$$\text{Node breadth}=1+\text{breadth of previous node of the same depth} \quad (2),$$

where client node represents the first node 302. Still referring to FIG. 3A, based on the above formulas (1) and (2), at 412, data analysis engine 112 assigns values (depth=2, breadth=1) and (depth=2, breadth=2) to the second 304 and third nodes 306, respectively. As shown in FIG. 3A, the newly generated nodes 304 and 306 are placed within the graph 300 in accordance with their depth and breadth values. As noted above, the graph 300 is generated by the data analysis engine 112 so that depth increases in dimension from left to right and breadth increases in dimension from top to bottom.

At 414, data analysis engine 112 determines whether there are any remaining new nodes that have not been processed yet. In response to determining that there are newly generated nodes (i.e., nodes 304 and 306) in the current iteration (decision block 414, "Yes" branch), data analysis engine 112 repeats steps 406—412 by treating second 304 and third 306 nodes as new client nodes. In the illustrated embodiment shown in FIG. 3A, this iterative execution of steps 406-412 results in generation of a new tier of nodes 308, 310 and 312 linked to the second node 304 by respective edges 324, 326 and 328 and generation of a new tier of nodes 314, 316 and 318 linked to the third node 306 by respective edges 330, 332 and 334. It should be noted that at this execution point of disclosed functionality all edges 320-334 have substantially the same width. According to an embodiment of the present invention, steps 406—412 may be repeated by data analysis engine 112 until the query performed at step 406 does not find any matching client statistics records.

In response to determining that there are no remaining new nodes (decision block 414, "No" branch), data analysis engine 112 may iteratively traverse the hierarchy of the graph 300 in order to provide additional visual information. More specifically, according to an embodiment of the present invention, at step 416, data analysis engine 112 traverses edges 320, 322, 324 and 330 in order to find the largest EURT value (referred to hereinafter as "maximum EURT value"). Advantageously, there is no need for data analysis engine 112 to traverse edges 326, 328 and 332, 334 because EURT values are sorted (see step 408 above). Continuing with the example illustrated in FIG. 3A, at step 416, data analysis engine 112 determines that edge 320 connecting the first 302 and second 304 nodes has the maximum EURT value 304a associated with that connection. As shown in FIG. 3A, the maximum EURT value 304a is approximately equal to 2.4 seconds.

Next, at 418, data analysis engine 112 traverses all edges 320-334 of the graph 300 one more time to adjust width of each edge based on the maximum EURT value determined at 416. For instance, since edge 320 connecting the first 302 and second 304 nodes is associated with the maximum EURT value, the width of edge 320 is set by data analysis engine 112 to some predefined width value. Next edge 322 is associated with the EURT value 306a approximately equal to 905 ms. Accordingly, at step 416, data analysis engine 112 adjusts the width of edge 322 so that the ratio of the width of edges 320 and 322 is substantially equal to the ratio of EURT values 304a and 306a, respectively. In other words, the width of edge 322 is approximately equal to one third (0.375) of the width of edge 320. This adjustment process is repeated by data analysis engine 112 for all of the remaining edges 324-334.

According to an embodiment of the present invention, at 420, data analysis engine 112 may traverse the graph 300 yet once again. In this iteration, data analysis engine 112 preferably retrieves from one or more databases 124 historical baseline thresholds of EURT values. In one embodiment, such baseline thresholds may comprise degradation and excessive thresholds described above. These baseline thresholds may be retrieved based on the site containing the IP addresses and application names associated with the nodes corresponding to the edge under consideration.

Further, at 422, data analysis engine 112 may traverse the graph 300 once again. In this iteration, data analysis engine 112 preferably designates a specific color to each of the edges 320-334 according to a predefined color coding scheme based on the retrieved historical thresholds of EURT values. In one non-limiting embodiment, an edge may be colored red if the corresponding EURT value substantially exceeds the excessive threshold, the edge may be colored yellow if the EURT value substantially exceeds the degraded threshold but is substantially below the excessive threshold and the edge may be colored green otherwise.

As illustrated in FIG. 3A, the graph 300 is generated by data analysis engine 112, so that it visually identifies (e.g., by color coding schemes and/or edge thickness in visual association with the EURT values) one or more network elements associated with the specified application performance issues. In one embodiment, data analysis engine 112 may perform further data analysis to identify performance problems domains associated with one or more potential root-causes of network performance failures. As mentioned earlier and as should be reiterated herein, EURT comprises four components, more specifically, application delay, network delay, server delay and client delay. Accordingly, for those nodes of graph 300 that represent most probable causes of application performance problems, such as nodes 304 and 308, data analysis engine 112 may further present performance problem domain indicators 340 and 342, respectively. For instance, if EURT associated with node 308 is approximately equal to 271.2 ms and can be broken into 46.9 ms, 1.3 ms, 3.5 ms and 219.4 ms corresponding, respectively, to application delay, server delay, network delay and client delay, data analysis engine 112 may display the performance problem domain indicator in a color corresponding to the client delay. In one non-limiting embodiment, green color may represent application delay problem domain, red may represent server delay problem domain, blue may represent network delay problem domain and orange may represent client delay problem domain. Continuing with the above example, data analysis engine 112 may display the performance problem domain indicator 342 in orange color. Similarly, if data analysis engine 112 determines that EURT 304a associated with the second node 304 is attributed primarily to the network delay (e.g., 2.2 s out of 2.4 s EURT), data analysis engine 112 displays the performance problem domain indicator 340 associated with second node 304 in blue color. While particular color-coding schemes have been provided and are described herein, it will be understood that any desirable or useful color-coding scheme may be employed with embodiments of the present disclosure. Further, other suitable visualization schemes are also contemplated, such as schemes that use a grey scale, or that use other symbols to distinguish differences between EURT values with respect to historical thresholds and/or to visually distinguish differences between integral components of EURT values.

At least in some embodiments, data analysis engine 112 may further display a EURT trend 350, including, for example, the maximum EURT value 350a for the specified time range. The EURT trend 350 can be generated based on a time range that varies depending upon the problem being investigated. In some instances, the time over which EURT trend 350 is generated can be as short as a few minutes or as long as many hours. It should be noted that data analysis engine 112 uses a different time period to generate graph 300, which is determined by the selected time slice of EURT trend 350. In one non-limiting embodiment, the selected time slice may be substantially equal to the maximum EURT value 350a. Further, FIG. 3B illustrates a graph 300 very similar to the graph 300 of FIG. 3A further illustrating performance problem domain indicators 344 and 346 associated with nodes 306 and 314, respectively, which may be displayed according to the above color-coding scheme and which may be displayed as a result of a second phase of performance problems domain analysis operation.

In summary, advantageously, data analysis engine 112 visually presents performance data (i.e., end-user response time data) in a format that enables a wide range of end users to quickly determine the root cause and magnitude of performance issues in multi-tiered applications. More specifically, the root cause is clearly identified (visually) by positioning nodes having a low breadth value (i.e., 1 or 2) on top of the graph 300 shown in FIGS. 3A and 3B. Further, data analysis engine 112 visually indicates magnitude of performance issues in multi-tiered applications by contrasting dimensions of the edges. For instance, edges 320 and 322 on top left of the graph 300 have relatively large width and that width tends to shrink substantially for the edges located to the right of the root cause problem.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for visual representation of end user response time in a multi-tiered network application in a network analyzer device coupled to a network, the method comprising the steps of:

receiving, by a processor of the network analyzer device, search criteria for searching a repository of client statistics records, the search criteria specifying identification information pertaining to a user of a multi-tiered network application experiencing one or more application performance problems and a time period associated with the one or more application performance problems, the identification information identifying an IP address of user's computing device;

retrieving from the repository, by a processor, a plurality of client statistics records matching the search criteria;

sorting, by the processor, the retrieved plurality of client statistics records based on measurements of performance parameters;

presenting a graph in the network analyzer device representing relevant topology hierarchy of the multi-tiered network application based on the sorted client statistics records, the graph visually identifying one or more connections between nodes of the multi-tiered network application; and presenting a plurality of edges interconnecting the hierarchy of node objects wherein a width of an edge interconnecting node objects is dependent upon a determined largest End User Response Time (EURT) of the interconnected nodes, wherein the identified connections comprise potential root-causes of the one or more application performance problems.

2. The method of claim 1, wherein presenting a graph further comprises:

generating a hierarchy of node objects representing network devices relevant to the application performance problems;

assigning corresponding breadth and depth values to each of the generated nodes; and presenting the hierarchy of node objects so that depth values associated with each node increase in dimension from left to right and breadth values associated with each node increase in dimension from top to bottom.

3. The method of claim 1, further comprising visually identifying at least one performance problem domain associated with the one or more application performance problems, wherein the performance problem domain comprises at least one of: a client environment domain, a server environment domain, a network domain and a software application domain.

4. The method of claim 1, wherein presenting a graph further comprises visually presenting the measurements of performance parameters in descending order.

5. The method of claim 1, wherein visually identifying the one or more connections further comprises presenting the one or more connections according to a color coding scheme.

6. The method of claim 5, wherein presenting a graph further comprises comparing the measurements of performance parameters against a plurality of predefined historic data thresholds indicative of acceptable, degraded performance, and excessively degraded performance and wherein the color coding scheme is indicative of the comparison.

7. The method of claim 1, wherein presenting a graph further comprises determining a maximum value of the measurements of performance parameters and wherein the edge associated with the maximum value is visually presented as having a predetermined width indicative of the maximum value.

8. The method of claim 7, wherein presenting the plurality of edges further comprises comparing respective values of the measurements of performance parameters associated with each edge with the maximum value and presenting the plurality of edges so that the ratios between widths of each edge and the predetermined width are substantially equal to the ratios of respective performance parameter values and the maximum value.

9. A network analyzer device coupled to a network for visual representation of end user response time, in a multi-tiered network application, the network analyzer device comprising one or more processors, one or more computer-readable storage devices, and a plurality of program instructions stored on at least one of the one or more storage devices for execution by at least one of the one or more processors, the plurality of program instructions comprising:

program instructions to receive search criteria for searching a repository of client statistics records, the search criteria specifying identification information pertaining to a user of a multi-tiered network application experiencing one or more application performance problems and a time period associated with the one or more application performance problems, the identification information identifying an IP address of user's computing device;

program instructions to retrieve from the repository a plurality of client statistics records matching the search criteria;

program instructions to sort the retrieved plurality of client statistics records based on measurements of performance parameters; and program instructions to present a graph in the network analyzer device representing relevant topology hierarchy of the multi-tiered network application based on the sorted client statistics records, the graph visually identifying one or more connections between nodes of the multi-tiered network application;

program instructions to generate a hierarchy of node objects representing network devices relevant to the application performance problems; and program instructions to present a plurality of edges interconnecting the hierarchy of node objects wherein a width of an edge interconnecting node objects is dependent upon a determined largest End User Response Time (EURT) of the interconnected nodes, wherein the identified connections comprise potential root-causes of the one or more application performance problems.

10. The computer system of claim 9, wherein the program instructions to present the graph further comprise:
 program instructions to assign corresponding breadth and depth values to each of the generated nodes; and
 program instructions to present the hierarchy of node objects so that depth values associated with each node increase in dimension from left to right and breadth values associated with each node increase in dimension from top to bottom.

11. The computer system of claim 9, further comprising program instructions to visually identify at least one performance problem domain associated with the one or more application performance problems, wherein the performance problem domain comprises at least one of: a client environment domain, a server environment domain, a network domain and a software application domain.

12. The computer system of claim 9, wherein the program instructions to present the graph further comprise program instructions to visually present the measurements of performance parameters in descending order.

\* \* \* \* \*